UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL CO., OF NEW YORK, N. Y., A CORPORATION OF NEW YORK.

STABLE HYDROGEN PEROXID.

1,058,070. Specification of Letters Patent. Patented Apr. 8, 1913.

No Drawing. Application filed November 17, 1911. Serial No. 660,785.

*To all whom it may concern:*

Be it known that I, OTTO LIEBKNECHT, a subject of the Emperor of Germany, and a resident of Frankfort-on-the-Main, Germany, have invented a new and useful Stable Hydrogen Peroxid, of which the following is a specification.

This invention relates to a stable hydrogen peroxid.

Heretofore strong mineral acids have been chiefly used in order to render hydrogen peroxid solutions stable, for instance, a certain quantity of phosphoric acid has been added to the hydrogen peroxid. The stability thus obtained is however of limited duration, as, after a short time, appreciable losses of active oxygen takes place. The addition of mineral acid has, however, been considered necessary, as, without it, a quicker decomposition takes place. The action of the mineral acid is accounted for by the stronger electrolytic dissociation of the mineral acid, which lessens the dissociation of the exceptionally weak acid hydrogen peroxid and thus prevents decomposition.

The comparatively low degree of stability of the present hydrogen peroxid solutions, even with the addition of mineral acids, has been commercially a great drawback, and medically the use of such acid hydrogen peroxid solutions is greatly retarded on account of causing irritation.

There is in the market a 30% chemically pure hydrogen peroxid which, however, in order to preserve its stability, must be kept in paraffined bottles. This product has to be diluted before using and then undergoes the quick decomposition hereinabove described.

The object of the present invention is to overcome the difficulties and disadvantages set forth.

The prominent novel idea of the present invention is the outgrowth of several previous inventions for which applications for patents have been made. In one of these prior applications for Letters Patent, Serial No. 611,587, filed March 11th, 1911, I have stated that the addition of a very small quantity of sulfanilic acid to an aqueous hydrogen peroxid solution renders the same stable.

On further investigation I have found out that the drawbacks connected with the use of a mineral acid, such as sulfuric acid, may be greatly reduced if the sulfuric acid is combined with an aromatic hydrocarbon into a so-called aromatic sulfonic acid; for instance, in case of benzene and sulfuric acid forming benzene-sulfonic acid; and although said aromatic sulfonic acids are much less dissociated electrolytically than sulfuric acid, I have furthermore discovered that besides benzene-sulfonic acid, also other similar acids exert the same stabilizing effect on an aqueous hydrogen peroxid solution as for instance, naphthalene-sulfonic acid, anthracene-sulfonic acid, etc. as well as the corresponding disulfonic acids of these aromatic hydrocarbons. The addition of a very small quantity of any of such aromatic acids to an aqueous solution of hydrogen peroxid, prepared in any way, renders the same stable. The following example serves as an elucidation of my process: 2 grams of benzene-sulfonic acid may be dissolved in one liter of a 20% aqueous hydrogen peroxid solution, thus rendering the solution stable, while a plain hydrogen peroxid solution of the same strength without the benzene-sulfonic acid easily undergoes decomposition.

The action of the aromatic sulfonic acids is effective for aqueous solutions of hydrogen peroxid of another concentration and I do not restrict myself to the degree of concentration set forth or to any specific proportion of any of the aromatic sulfonic acids to be used, various proportions of such acids producing the results set forth when added to hydrogen peroxid solutions of various degrees of concentration.

What I claim and desire to secure by Letters Patent is:

1. A hydrogen peroxid solution containing a substance which in turn contains a body formed by the combination of sulfuric acid with an aromatic hydrocarbon.

2. A hydrogen peroxid solution containing benzene-sulfonic acid.

In testimony whereof I have signed this specification in the presence of two subscribing witnesses.

OTTO LIEBKNECHT.

Witnesses:
 JEAN GRUND,
 CARL GRUND.